US007437276B2

(12) United States Patent
Kropaczek et al.

(10) Patent No.: US 7,437,276 B2
(45) Date of Patent: Oct. 14, 2008

(54) METHOD AND APPARATUS FOR EVALUATING A PROPOSED SOLUTION TO A CONSTRAINT PROBLEM

(75) Inventors: David J. Kropaczek, Wilmington, NC (US); Christian C. Oyarzun, Wilmington, NC (US); Steven B. Sutton, Wilmington, NC (US); Mehdi Asgari, Wilmington, NC (US)

(73) Assignee: Global Nuclear Fuel -- Americas, LLC, Wilmington, NC (US)

( * ) Notice: Subject to any disclaimer, the term of this patent is extended or adjusted under 35 U.S.C. 154(b) by 385 days.

(21) Appl. No.: 11/024,431

(22) Filed: Dec. 30, 2004

(65) Prior Publication Data

US 2006/0167566 A1 Jul. 27, 2006

(51) Int. Cl.
*G06F 7/60* (2006.01)
*G06F 17/10* (2006.01)
*G05B 13/02* (2006.01)

(52) U.S. Cl. .................................. 703/2; 703/6; 700/28

(58) Field of Classification Search ..................... 703/2, 703/6; 700/28
See application file for complete search history.

(56) References Cited

U.S. PATENT DOCUMENTS 5,193,056 A * 3/1993 Boes ........................ 705/36 R
6,748,348 B1 6/2004 Russell, II ..................... 703/6
2003/0086520 A1 5/2003 Russell, II et al. .......... 376/259
2004/0059696 A1 3/2004 Kropaczek et al. ............ 706/46

OTHER PUBLICATIONS

David J. Kropaczek, William E. Russell "Method for Optimization of BWR Fuel Management and Plant Operations", American Nuclear Society, Advances in Nuclear Fuel Management III ANFM 2003, Oct. 5-8, 2003, pp. 1-12.*

Christian C. Oyarzun, David J. Kropaczek, Steven B. Sutton, William E. Russell, "The Global Nuclear Fuel Optimization System for BWR Fuel Cycle Management", American Nuclear Society, Advances in Nuclear Fuel Management III ANFM 2003, Oct. 5-8, 2003, pp. 1-9.*

* cited by examiner

*Primary Examiner*—Zoila E. Cabrera
*Assistant Examiner*—Dwin M Craig
(74) *Attorney, Agent, or Firm*—Harness, Dickey & Pierce, PLC

(57) ABSTRACT

A method of evaluating constraint functions, the evaluation being based at least in part on a fuel bundle movement criteria.

20 Claims, 4 Drawing Sheets

Generate a Current Loading Map — S500

Generate a New Loading Map — S510

Configure an Objective Function Including at Least One Penalty Term Being a Determined Number of Fuel Bundle Movements — S530

To S12

METHOD AND APPARATUS FOR EVALUATING A PROPOSED SOLUTION TO A CONSTRAINT PROBLEM

BACKGROUND OF THE INVENTION

Most problems encountered in engineering design are nonlinear by nature and involve the determination of system parameters that satisfy certain goals for the problem being solved. Such problems can be cast in the form of a mathematical optimization problem where a solution is desired that minimizes a system function or parameter subject to limitations or constraints on the system. Both the system function and constraints are comprised of system inputs (control variables) and system outputs, which may be either discrete or continuous. Furthermore, constraints may be equalities or inequalities. The solution to a given optimization problem has either or both of the following characteristics: 1) minimizes or maximizes a desired condition or conditions, thus satisfying the optimality condition and 2) satisfies the set of constraint equations imposed on the system.

With the above definitions, several categories of optimization problems may be defined. A Free Optimization Problem (FOP) is one for which no constraints exist. A Constraint Optimization Problem (COP) includes both constraints and a minimize (or maximize) condition(s) requirement. In contrast, a Constraint Satisfaction Problem (CSP) contains only constraints. Solving a CSP means finding one feasible solution within the search space that satisfies the constraint conditions. Solving a COP means finding a solution that is both feasible and optimal in the sense that a minimum (or maximum) value for the desired condition(s) is realized.

The solution to such a problem typically involves a mathematical search algorithm, whereby successively improved solutions are obtained over the course of a number of algorithm iterations. Each iteration, which can be thought of as a proposed solution, results in improvement of an objective function. An objective function is a mathematical expression having parameter values of a proposed solution as inputs. The objective function produces a figure of merit for the proposed solution. Comparison of objective function values provides a measure as to the relative strength of one solution versus another. Numerous search algorithms exist and differ in the manner by which the control variables for a particular problem are modified, whether a population of solutions or a single solution is tracked during the improvement process, and the assessment of convergence. However, these search algorithms rely on the results of an objective function in deciding a path of convergence. Examples of optimization algorithms include Genetic Algorithms, Simulated Annealing, and Tabu Search.

Within optimization algorithms, the critical issue of handling constraints for COPs and CSPs must be addressed. Several classes of methods exist for dealing with constraints. The most widespread method is the use of the penalty approach for modifying the objective function, which has the effect of converting a COP or CSP into a FOP. In this method, a penalty function, representing violations in the set of constraint equations, is added to an objective function characterizing the desired optimal condition. When the penalty function is positive, the solution is infeasible. When the penalty function is zero, all constraints are satisfied. Minimizing the modified objective function thus seeks not only optimality but also satisfaction of the constraints.

Objective functions take application specific forms, and therefore, each new problem or modification to a problem requires the construction of a new objective function. Furthermore, the objective function plays the important role of guiding an optimization algorithm to a possible best solution. Presumably, the better the objective function, the better the optimization result and/or the more efficient the optimization operation. Accordingly, a constant demand exists in the field of constraint based problems for improved objective functions.

SUMMARY OF THE INVENTION

The invention provides a systematic and general method and apparatus for defining an objective function for Constrained Optimization Problems (COPs), Constraint Satisfaction Problems (CSPs) and Free Optimization Problems (FOPs), independent of the optimization search employed. The invention provides a generic definition of an objective function. Given the particular optimization problem (e.g., boiler water nuclear reactor core design, transportation scheduling, pressure water reactor core design, or any large scale, combinatorial optimization problem in discrete or continuous space), the objective function is configured following the generic definition.

Specifically, the generic definition of the objective function according to the present invention is a sum of credit components plus a sum of penalty components. Each credit component includes a credit term times an associated credit weight. Each penalty term includes a penalty term times an associated penalty weight. A credit term is a mathematical expression representing an optimization parameter, and a penalty term is a mathematical expression representing an optimization constraint.

Configuring an objective function involves establishing the number of credit and penalty components, establishing the mathematical expressions for the credit and penalty terms and establishing the initial weights of the credit and penalty weights. At least one of the penalty terms is based on fuel bundle movements during an outage. This is accomplished through user input or by accessing a previously stored configured objective function.

The configured objective function is then usable as part of an optimization process, or is usable a tool when a user assesses a candidate solution to an optimization problem. Because of the flexibility of the invention, changes in optimality conditions, constraint term definitions, and weight factors are readily accommodated.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting on the present invention and wherein.

DETAILED DESCRIPTION OF THE EMBODIMENTS

The Generic Objective Function

Figure 1:
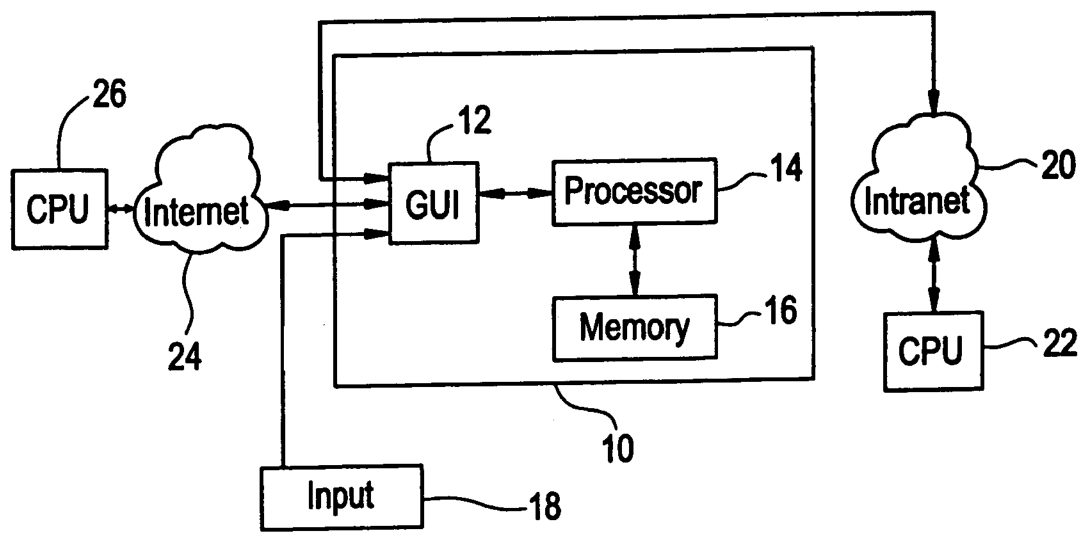
FIG. 1 illustrates an embodiment of an architecture according to the present invention for implementing the method of evaluating a proposed solution according to the present invention.

The present invention provides a generic definition of an objective function, which is applicable across a wide variety of constraint and optimization problems. Namely, the generic objective function is applicable to any large scale, combinatorial optimization problem in discrete or continuous space such as boiler water reactor core design, pressurized water reactor core design, transportation scheduling, resource allocation, etc. The generic objective function is defined as a sum of credit and penalty components. A penalty component includes a penalty term multiplied by an associated penalty weight. A credit component includes a credit term multiplied by an associated credit weight. The credit terms represent the optimality conditions for the problem. The penalty terms represent the constraints for the problem. Each credit term is a mathematical expression that quantifies an optimality condition. Each penalty term is a mathematical expression that quantifies a constraint. Mathematically, this can be expressed as follows:

$$F_{obj} = \sum_{m} \lambda_m^{credit} C_m + \sum_{n} \lambda_n^{penalty} P_n$$

where, $F_{obj}$=objective function $C_m$=credit term m $P_n$=penalty term n $\lambda_m^{credit}$=weight factor credit term m $\lambda_m^{penalty}$=weight factor penalty term n Credit and penalty terms may be defined by maximum (i.e. upper bounded) or minimum (i.e. lower bounded) values and can represent scalar or multi-dimensional values. The only requirements are: 1) the penalty terms must be positive for constraint violations and zero otherwise, and 2) in the absence of constraint violations, the credit terms are consistent with a minimization problem. Thus, minimizing the modified objective function solves the optimization problem.

As an example, consider an air-conditioning system where the optimization problem is to minimize the average air temperature within a room, yet assure that no region within the room exceeds a certain temperature. For this example, the credit would be the average air temperature within the room volume. The constraint would be a limit on the point-wise temperature distribution within the room, which, in the form of a penalty term, would be calculated as the average temperature violation. To obtain the average temperature violation one would sum the differences of actual and limiting temperature values for those points within the room that violate and divide by the total number of points. Alternatively, one could calculate the penalty term as the maximum value of the point-wise temperature violations within the room. The form of the generic objective function thus allows any number of credit and penalty terms to be defined in a general manner for the problem being solved.

Forms for the credit or penalty terms include, but are not limited to:

The maximum value within a data array;

The minimum value within a data array;

The average of values within a data array;

The integral of values within a data array;

The maximum of calculated differences between elements of a data array and the corresponding constraint limit, restricted to elements that violate;

The minimum of calculated differences between elements of a data array and the corresponding constraint limit, restricted to elements that violate;

The average of calculated differences between elements of a data array and the corresponding constraint limit, restricted to elements that violate; and The integral of calculated differences between elements of a data array and the corresponding constraint limit, restricted to elements that violate.

A Generic Architecture for Implementing the Objective Function

FIG. 1 illustrates an embodiment of an architecture according to the present invention for implementing the method of evaluating a proposed solution according to the present invention. As shown, a server 10 includes a graphical user interface 12 connected to a processor 14. The processor 14 is connected to a memory 16. The server 10 is directly accessible by a user input device 18 (e.g., a display, keyboard and mouse). The server 10 is also accessible by computers 22 and 26 over an intranet 20 and the Internet 24, respectively. The operation of the architecture shown in FIG. 1 will be discussed in detail below.

Configuring the Objective Function for an Optimization Problem

According to one embodiment, a configured objective function satisfying the above-described generic definition is already stored in the memory 16 of the server 10. For example, the configured objective function could have been configured according to one of the embodiments described below. In this embodiment, the user instructs the server 10 to provide a list of the configured objective functions stored in the memory 16, and instructs the server 10 to use one of the listed configured objective functions.

In another embodiment, a user via input 18, computer 26 or computer 22 accesses the server 10 over the graphical user interface 12. The user supplies the server 10 with a configured objective function meeting the definition of the above-described generic definition. In this embodiment, the user supplies the configured objective function using any well-known programming language or program for expressing mathematical expressions. Specifically, the user instructs the processor 14 via the graphical user interface 12 to upload a file containing the configured objective function. The processor 14 then uploads the file, and stores the file in memory 16.

In still another embodiment, configuring the objective function is interactive between the user and the server 10. Here, the user instructs the processor 14 to start the process for configuring an objective function. The processor 14 then requests the user to identify the number of credit components and the number of penalty components. For each credit component, the processor 14 requests that the user provide a mathematical expression for the credit term and an initial weight for the associated credit weight. For each penalty component, the processor 14 requests that the user provide a mathematical expression for the penalty term and an initial weight for the associated penalty weight. In supplying the mathematical expression, the processor 14 via the graphical user interface 12 accepts definitions of mathematical expressions according to any well-known programming language or program.

In another embodiment, the server 10 is preprogrammed for use on a particular constraint or optimization based problem. In this embodiment, the server 10 stores possible optimization parameters and possible constraint parameters associated with the particular optimization or constraint problem. When a user instructs the processor 14 via the graphical user interface 12 to configure an objective function, the processor 14 accesses the possible optimization parameters already stored in the memory 16, and provides the user with the option of selecting one or more of the optimization parameters for optimization.

Figure 2:
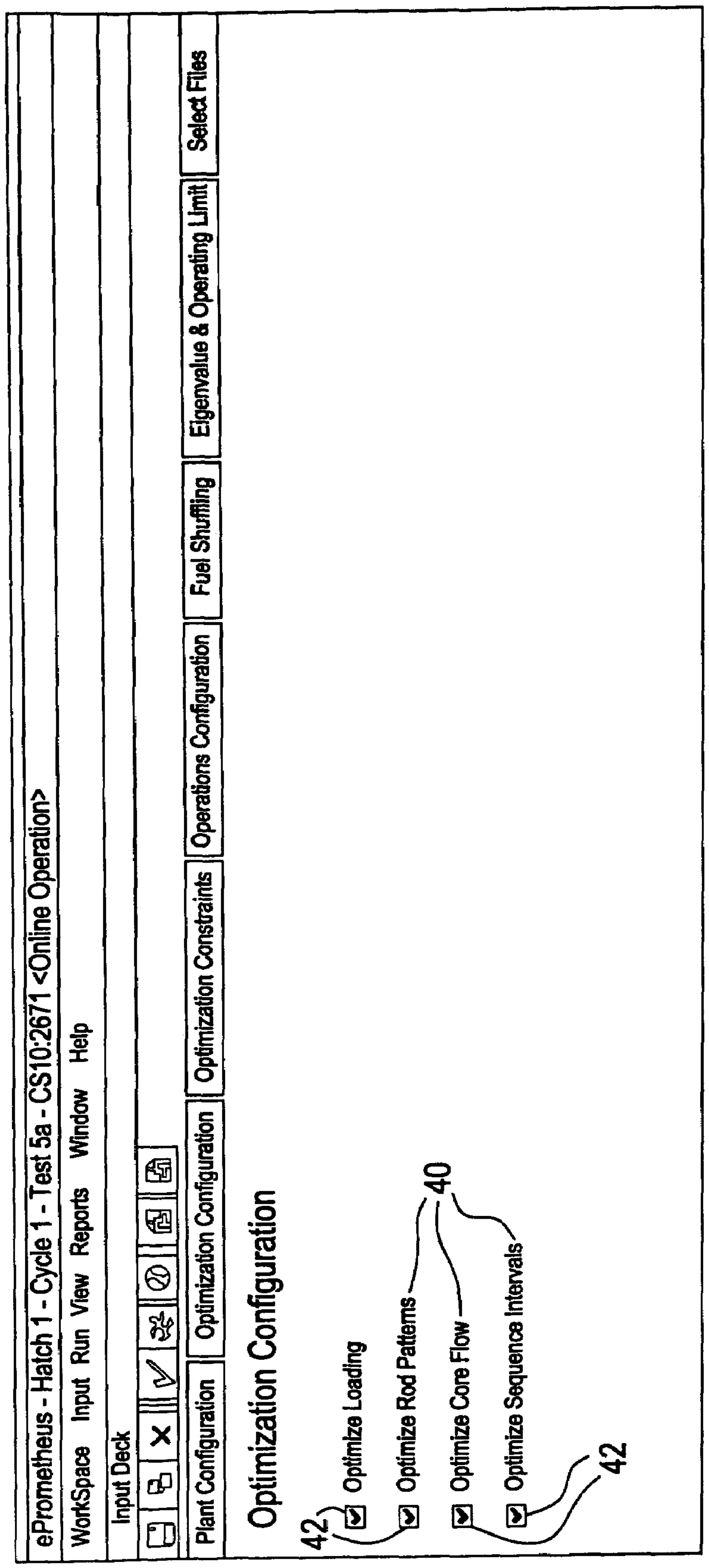
FIG. 2 illustrates a screen shot of an optimization configuration page used in selecting one or more optimization parameters associated with the optimization problem of boiler water reactor core design according to an embodiment of the present invention.

FIG. 2 illustrates a screen shot of an optimization configuration page used in selecting one or more optimization parameters associated with the optimization problem of boiling water reactor core design according to this embodiment of the present invention. As shown, the optimization parameters 40 of optimize loading, optimize rod patterns, optimize core flow, and optimize sequence intervals are available for selection by the user as optimization parameters. Optimize loading means making an optimal determination of fresh and exposed fuel bundle placements within the core design (i.e., fuel bundle movements). The loading determines the energy capability of the core design as well as the global power shape. Optimize rod patterns means making an optimal determination of individual control rod positions within a control rod grouping (called a sequence), for the duration of time during the operating cycle when the given sequence is being used to control the reactor. Rod positions affect the local power as well as the nuclear reaction rate within the fuel bundles. Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence (i.e., control rod grouping) is used to control the reactor during the operating cycle. Sequence intervals affect local power as well as the nuclear reaction rate.

Using the data input device 18, computer 22 or computer 26, each of which includes a display and a computer mouse, the user selects one or more of the optimization parameters by clicking in the selection box 42 associated with an optimization parameter 40. When selected, a check appears in the selection box 42 of the selected optimization parameter. Clicking in the selection box 42 again de-selects the optimization parameter.

Figure 3:
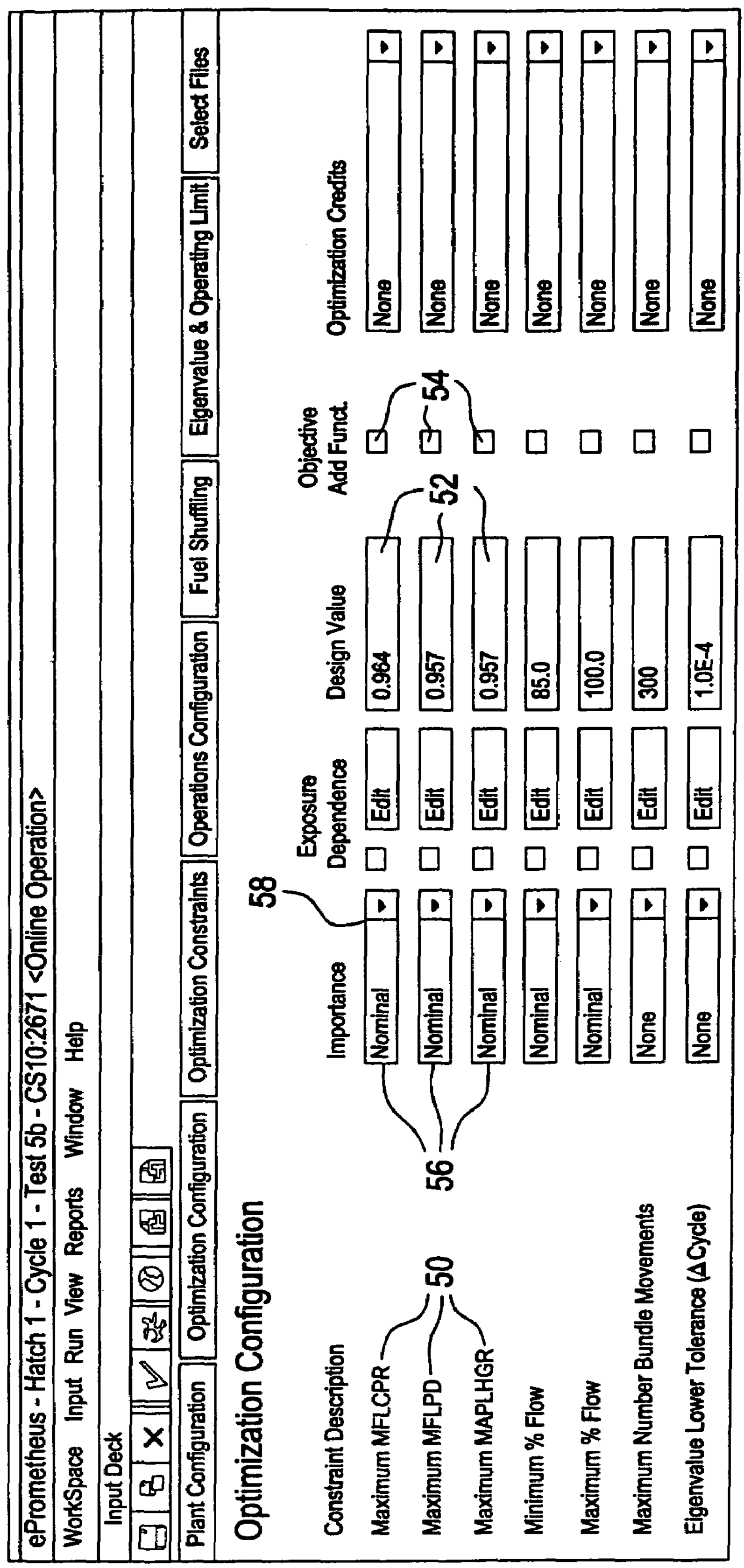
FIG. 3 illustrates a screen shot of an optimization constraints page listing optimization constraints associated with the optimization problem of boiler water reactor core design according to an embodiment of the present invention.

The memory 16 also stores constraint parameters associated with the optimization problem. The constraint parameters are parameters of the optimization problem that must or should satisfy a constraint or constraints. FIG. 3 illustrates a screen shot of an optimization constraints page listing optimization constraints associated with the optimization problem of boiler water reactor core design according to this embodiment of the present invention. As shown, each optimization constraint 50 has a design value 52 associated therewith. Each optimization constraint must fall below the specified design value. The user has the ability to select optimization parameters for consideration in configuring the objective function. Using the data input device 18, computer 22 or computer 26, each of which includes a display and a computer mouse, the user selects an optimization constraint by clicking in the selection box 54 associated with an optimization constraint 50. When selected, a check appears in the selection box 54 of the selected optimization constraint 50. Clicking in the selection box 54 again de-selects the optimization constraint.

Each optimization parameter has a predetermined credit term and credit weight associated therewith stored in memory 16. Similarly, each optimization constraint has a predetermined penalty term and penalty weight associated therewith stored in memory 16. In the embodiment shown in FIG. 3, the penalty term incorporates the design value, and the user can change (i.e., configure) this value as desired. Additionally, the embodiment of FIG. 3 allows the user to set an importance 56 for each optimization constraint 50. In the importance field 58 for an optimization constraint, the user has pull down options of minute, low, nominal, high and extreme. Each option correlates to an empirically predetermined penalty weight such that the greater the importance, the greater the predetermined penalty weight. In this manner, the user selects from among a set of predetermined penalty weights.

Once the above-selections have been completed, the processor 14 configures the objective function according to the generic definition discussed above and the selections made during the selection process. The resulting configured objective function equals the sum of credit components associated with the selected optimization parameters plus the sum of penalty components associated with the selected optimization constraints.

Additionally, the embodiment provides for the user to select a method of handling the credit and penalty weights. For example, the user is supplied with the possible methodologies of static, death penalty, dynamic, and adaptive for the penalty weights; is supplied with the possible methodologies of static, dynamic and adaptive for the credit weights; and the methodology of relative adaptive for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change. The well-known adaptive methodology is also applied during the course of an optimization search. In this method, penalty weight values are adjusted periodically for each constraint parameter that violates the design value. The relative adaptive methodology is disclosed in U.S. application Ser. No. [10/246,718], titled METHOD AND APPARATUS FOR ADAPTIVELY DETERMINING WEIGHT FACTORS WITHIN THE CONTEXT OF AN OBJECTIVE FUNCTION, by the inventors of the subject application.

Optimization using the Objective Function

Figure 4:
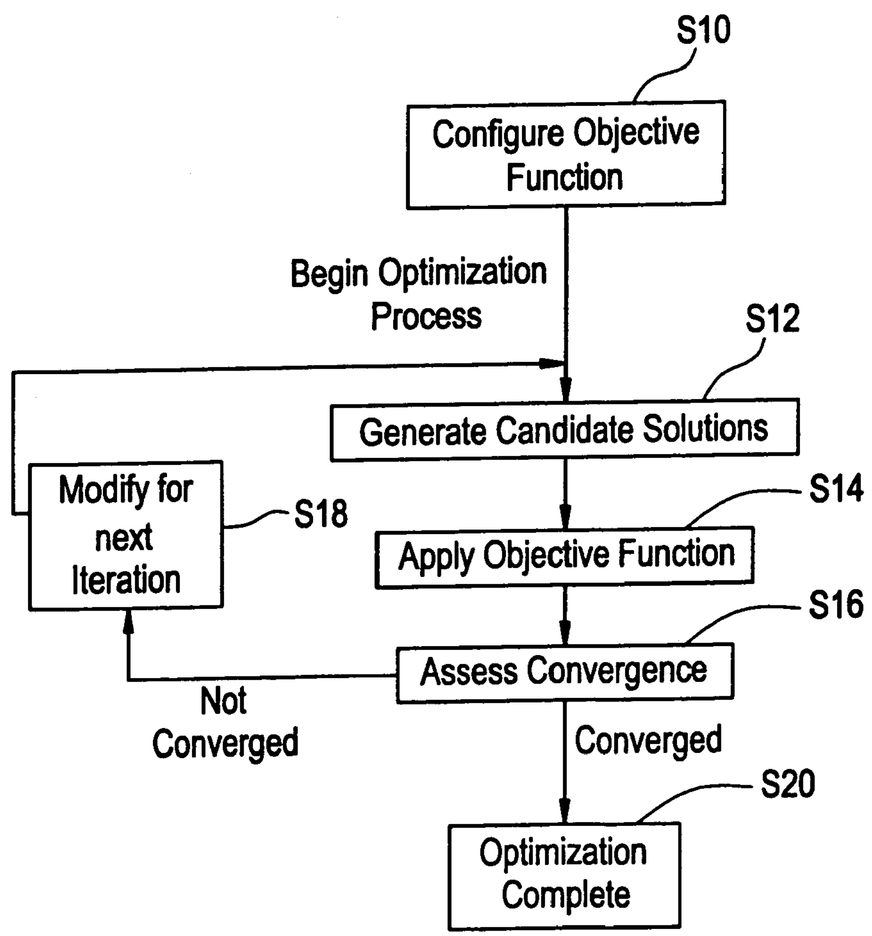
FIG. 4 illustrates a flow chart of an optimization process employing the objective function of the present invention.

FIG. 4 illustrates a flow chart showing one of the many uses for the objective function of the present invention. Specifically, FIG. 4 illustrates a flow chart of an optimization process employing the objective function of the present invention. For the purposes of explanation only, the optimization process of FIG. 4 will be described as being implemented by the architecture illustrated in FIG. 1. As shown, in step S10 the objective function is configured as discussed above in the preceding section, then the optimization process begins. In step S12, the processor 14 retrieves from memory 16 or generates one or more sets of values for input parameters (i.e., system inputs) of the optimization problem based on the optimization algorithm in use. For example, for the optimization problem of boiler water reactor core design, some of the input parameters would be placement of fresh and exposed fuel bundles within the reactor, selection of the rod groups (sequences) and placement of the control rod positions within the groups as a function of time during the cycle, core flow as a function of time during a cycle, reactor coolant inlet pressure, etc. Each input parameter set of values is a candidate solution of the optimization problem. The processor 14 runs a simulated operation and generates a simulation result for each input parameter set of values. For example, for boiling water reactor core design, a well-known simulation program for boiling water reactor operation is run using an input parameter set. The simulation result includes values (i.e., system outputs) for the optimization parameters and optimization constraints. These values, or a subset of these values, are values of the variables in the mathematical expressions of the objective function.

Then, in step S14, the processor 14 uses the objective function and the system outputs to generate an objective function value for each candidate solution. In step S16, the processor 14 assesses whether the optimization process has converged upon a solution using the objective function values generated in step S14. If no convergence is reached, then in step S18, the input parameter sets are modified, the optimization iteration count is increased and processing returns to step S12. The generation, convergence assessment and modification operations of steps S12, S16 and S18 are performed according to any well-known optimization algorithm such as Genetic Algorithms, Simulated Annealing, and Tabu Search. When the optimization problem is boiler water reactor core design, the optimization algorithm can be, for example, one of the optimization processes as disclosed in U.S. patent Ser. No. 09/475,309, titled SYSTEM AND METHOD FOR OPTIMIZATION OF MULTIPLE OPERATIONAL CONTROL VARIABLES FOR A NUCLEAR REACTOR or U.S. application Ser. No. 09/683,004, tilted SYSTEM AND METHOD FOR CONTINUOUS OPTIMIZATION OF CONTROL-VARIABLES DURING OPERATION OF A NUCLEAR REACTOR, filed Nov. 7, 2001.

The Objective Function as a Tool

Before the advent of fairly successful optimization tools, generating viable solutions to an optimization problem fell on the shoulders of highly experienced individuals, who through years of practice and experience in a particular field, developed a set of skills for generating possible solutions to the optimization problem. Even today such practices continue. However, these individuals still need a reliable method for assessing their solutions. The objective function of the present invention provides such a tool.

Referring again to FIG. 1 for the purposes of explanation only, an individual desiring to apply an objective function according to the present invention accesses the server 10 via input 18, computer 26 or computer 22. The user then configures an objective function as described above; for example, the user accesses a previously stored configured objective function or configures the objective function through data entry. The user then supplies the values for the input variables of the objective function, and receives an objective function result. The user can perform this operation for different candidate solutions to obtain figures of merit regarding the solutions. In this manner, the user treats the objective function as a tool in determining a solution to the optimization problem.

The invention provides a systematic and general method for defining an objective function for Constrained Optimization Problems (COPs), Constraint Satisfaction Problems (CSPs) and Free Optimization Problems (FOP), independent of the optimization search employed. The invention provides a mechanism within the context of the penalty function approach for addressing: 1) any number of constraints and optimality conditions, 2) different mathematical forms for the credit and penalty terms and 3) any number of dimensions in the candidate solution data and constraints. The invention provides a prescription for encoding objective function definitions within an optimization search through a software data module. Because of the flexibility of the invention, changes in optimality conditions, constraint term definitions, and weight factors are readily accommodated within the calling program simply by changing the data passed to the software data module.

The technical effort of the invention is a computer system that provides for configuring an objective function for a given optimization problem; a computer system that generates a possible solution for a particular optimization problem; and a computer system that allows internal and external users to measure the performance of their possible solutions to an optimization problem.

Optimization Including a Consideration of Fuel Bundle Movement

In a conventional nuclear reactor, after a given period of operation (called a cycle), the reactor is shut down for maintenance. The period of time that the reactor is shut down is often referred to as an outage. Generally, the outage must occur at a frequency of once every year to two years. A portion of the scheduled maintenance is reserved for refueling the reactor. This refueling may include removing burnt or exposed fuel bundles from the core, inserting fresh fuel bundles into the core, and, in some instances, repositioning fuel bundles within the core.

Any fuel bundle movement, including a removal, insertion, and repositioning, may require a considerable amount of the time allotted to the refueling of the reactor. Further, a plurality of fuel bundle movements cannot be performed simultaneously due to mechanical constraints within the core. Only one fuel bundle may be moved within the reactor at a given time. For example, if the positions of first and second fuel bundles were to be swapped, a mechanical crane would need to remove the second fuel bundle and place it in a storage pool called a fuel pool. The crane would then move the first fuel bundle into the position vacated by the second fuel bundle. The crane would then remove the second fuel bundle from the fuel pool and insert the second fuel bundle into the position vacated by the first fuel bundle.

By conventional methods, a large portion of the time during an outage may be associated with the refueling operation. Since fuel bundle movements must occur serially, the duration of the outage may scale with the number of fuel bundle movements.

In a boiling water reactor, a plurality of fuel bundles may each store a plurality of fuel rods. Fuel rods deliver fuel for the nuclear reaction inside the core of the boiling water reactor. The fuel bundles may be analyzed using a loading map. The loading map sets forth the placement of fuel bundles and their attributes (e.g., serial number or identifier of the bundle; bundle type—fresh, exposed, etc.; reactivity; etc. . . . ).

Figure 5:
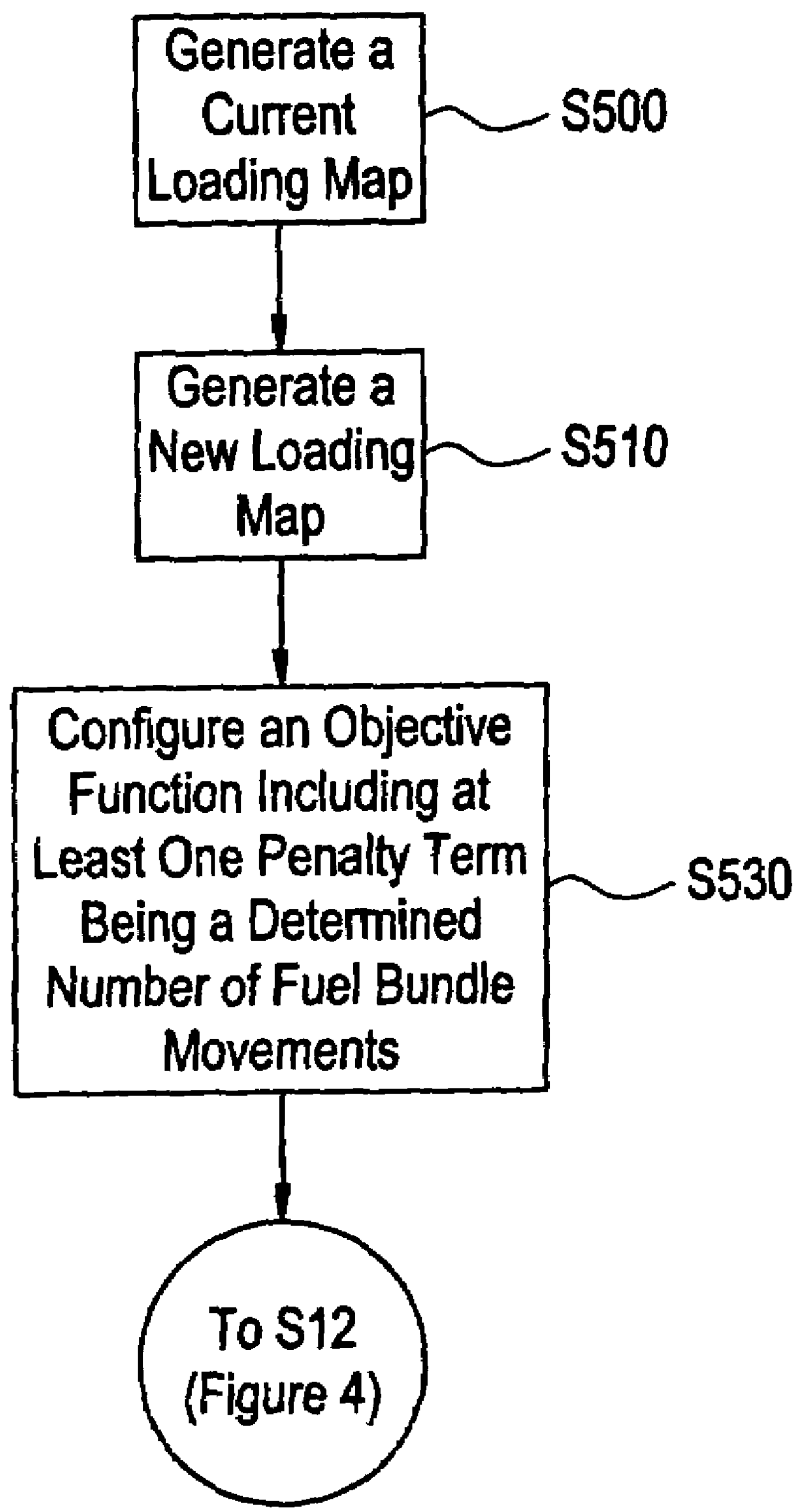
FIG. 5 illustrates a flow chart for taking fuel bundle movements into consideration when changing from a current loading map to a proposed loading map according to an exemplary embodiment of the present invention.

FIG. 5 illustrates a flow chart for taking fuel bundle movements into consideration when changing from a current loading map to a proposed loading map according to an exemplary embodiment of the present invention.

As shown, in step S500 a loading map of the current core when the reactor is shut down is created. Then, a new (i.e. proposed) loading map is generated for the next cycle of core operation in S510.

The proposed loading map may be generated according to any well known method. For example, one method of generating the loading map is through an experience based, trial and error, iterative process, performed by a core designer. Another method of generating the loading map is with a graphical user interface (GUI). The method of generating the loading map with the GUI is disclosed in U.S. application Ser. No. 10/678,170, filed Oct. 8, 2003, titled METHOD AND APPARATUS FOR FACILITATING RECOVERY OF NUCLEAR FUEL FROM A FUEL POOL, by the inventors of the subject application, incorporated herein by reference in its entirety.

As will be appreciated, the new loading map may include different attributes as compared to the current loading map. For example, a first cycle fuel bundle located in a position in the current loading map may be located in another position in the new loading map. In another example, the first cycle fuel bundle located in a position in the current loading map may not be in the proposed loading map, indicating that the first cycle fuel bundle should be removed from the core.

In S530, an objective function may be configured for evaluating the new loading map, as discussed in detail above. However, in this embodiment, at least one of the penalty terms of the objective function takes the number of fuel bundle movements into consideration (e.g., to reduce the number of fuel bundle movements). Exemplary methods of calculating the number of fuel bundle movements will be described later. The user may select the penalty weight associated with the fuel bundle movement constraint from among a set of predetermined penalty weights. For example, as above-described with reference to the embodiment shown in FIG. 3, the user may set an importance 56 for each optimization constraint 50. In the importance field 58 for an optimization constraint, the user has an enumerated set of pull down options of minute, low, nominal, high and extreme. The enumerated list of options is mapped to a set of weighting factors, utilized in the objective function, that reflect the qualitative description. In this case, at least one of the optimization constraints may be the number of fuel bundle movements.

Once the above-selections have been completed, the processor 14 configures the objective function according to the generic definition discussed above and the selections made during the selection process. The resulting configured objective function equals the sum of credit components associated with the selected optimization parameters plus the sum of penalty components associated with the selected optimization constraints.

Using the configured objective function, an optimization process such as described above with respect to FIG. 4 is performed. Thus, as shown in FIG. 5, after step S530, the process may advance to step S12 of FIG. 4. As discussed above, each candidate solution generated in S12 may result in a different loading map. The optimization process may advance through steps S14, S16, S18 and back to S12 recursively until step S16 determines convergence for a generated candidate solution (i.e., loading map).

The above-described process of taking a number of fuel bundle movements into consideration may be used as a tool. Referring again to FIG. 1 for the purposes of explanation only, an individual desiring to apply an objective function according to the present invention accesses the server 10 via input 18, computer 26 or computer 22. The user then configures an objective function as described above; for example, the user accesses a previously stored configured objective function or configures the objective function through data entry. The user then supplies the values for the input variables of the objective function, and receives an objective function result. The user can perform this operation for different candidate solutions to obtain figures of merit regarding the solutions. In this manner, the user treats the objective function as a tool in determining a solution to the optimization problem.

Fuel Bundle Movement Calculation

An exemplary method for calculating the number of fuel bundle movements between the current loading map and the new loading map will now be described. First, a counter is initialized to zero, with the counter indicating the number of fuel bundle movements between the current loading map and the new loading map. Next, each fuel bundle position in the current loading map is compared to a corresponding position in the new loading map. If the serial numbers in the corresponding fuel bundle positions of the current and new loading maps are different, the counter is incremented.

For example, if the comparison indicates that a fuel bundle is removed, this would be counted as one movement. If the comparison shows an entry of a fuel bundle not in the current loading map, this would be counted as one movement. Swapping bundles would be counted as three movements, since a swap includes a removal of a fuel bundle and two insertions (i.e., new entries or repositioning) of the fuel bundles into their new positions.

Alternatively, a current loading map is compared to a new loading map and a percent (%) changed is calculated based on fuel bundle differences between the current loading map and the new loading map.

It will be appreciated that this is a non-exhaustive list of bundle movement examples.

Thus, after each position of the current and new loading maps is analyzed in the above-described manner, the counter indicates the number of fuel bundle movements to the user. It is understood that the above-described determination of the number of fuel bundle movements may be performed manually by the core designer and/or may be automated with a processing device, such as a simulator.

This number may then serve as the penalty term that is then multiplied with the selected penalty weight in the objective function.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of evaluating a proposed solution to a nuclear reactor constraint problem, comprising:

providing an objective function definition generic to constraint problems, the generic objective function definition being a sum of a first number of credit terms plus a sum of a second number of penalty terms;

configuring the generic objective function into a nuclear reactor constraint problem objective function, the configuring including defining at least one of the second number of penalty terms to increase in significance within the configured objective function as an amount of fuel bundle movement in the proposed solution increases;

receiving a value of at least one variable in at least one credit term in the configured objective function, the credit term variable being related to the proposed solution;

receiving a value of at least one variable in at least one penalty term in the configured objective function, the penalty term variable being related to the proposed solution, at least one penalty term variable value representing an amount of fuel bundle movement; and generating a figure of merit for the proposed solution based on the credit term variable and the penalty term variable using the configured objective function.

2. The method of claim 1, wherein the at least one of the second number of penalty terms is based on a number of fuel bundle movements.

3. A method of evaluating a proposed solution to a constraint problem, comprising:

generating a first loading map and a second loading map, the first loading map representing a core prior to an outage;

determining a number of fuel bundle movements between the first loading map and the second loading map; and applying an objective function to evaluate the second loading map, the objective function including at least one penalty term configured to increase in significance within the objective function as the number of fuel bundle movements increases.

4. The method of 3, wherein the objective function includes a sum of a first number of credit terms plus a sum of a second number of penalty terms and the number of fuel bundle movements is one of the second number of penalty terms.

5. A method of evaluating a proposed solution to a constraint problem, comprising:

providing an objective function definition generic to constraint problems, the generic objective function definition being a sum of a first number of credit terms plus a sum of a second number of penalty terms;

configuring the generic objective function into an application specific objective function applicable to the constraint problem, the generic objective function including at least one penalty term variable increasing in significance within the configured objective function as an amount of fuel bundle movement in the proposed solution increases;

generating a figure of merit for the proposed solution based on the credit term variable and the penalty term variable using the application specific objective function.

6. The method of claim 5, wherein the configuring step comprises:

storing a set of credit terms associated with the constraint problem, the set of credit terms including at least one credit term;

storing a set of penalty terms associated with the constraint problem, the set of penalty terms including at least one penalty term;

receiving input selecting at least one credit term from the set of credit terms; and receiving input selecting at least one penalty term from the set of penalty terms.

7. The method of claim 5, wherein the receiving a value steps receive the credit and penalty term variable values from at least one of a user and a simulator.

8. The method of claim 5, wherein the providing step provides the following generic objective function definition $F_{obj}$, $$F_{obj} = \sum_m \lambda_m^{credit} C_m + \sum_n \lambda_n^{penalty} P_n$$

where, $C_m$ is credit term m, $P_n$ is penalty term n, $\lambda_m^{credit}$ is a weight factor for credit term m, $\lambda_m^{penalty}$ is a weight factor for penalty term n, and m and n are integers greater than or equal to one.

9. The method of claim 5, wherein the constraint problem relates to one of a boiling water reactor core design and a pressurized water reactor core design.

10. The method of claim 5, wherein the constraint problem relates to a large-scale, combinatorial optimization problem in discrete or continuous control variables.

11. The method of claim 5, wherein the at least one penalty term variable is based on a number of fuel bundle movements.

12. An apparatus for evaluating a proposed solution to a constraint problem, comprising:

a memory storing an application specific objective function configured based on a generic objective function definition generic to constraint problems, the generic objective function definition being a sum of a first number of credit terms plus a sum of a second number of penalty terms, at least one of the second number of penalty terms configured to increase in significance within the configured objective function as an amount of fuel bundle movement in the proposed solution increases;

an interface receiving a value of at least one variable in at least one credit term of the application specific objective function and receiving a value of at least one variable in at least one penalty term of the application specific objective function, the credit term variable and the penalty term variable being related to the proposed solution, at least one penalty term variable value representing an amount of fuel bundle movement in the proposed solution; and a processor generating a figure of merit for the proposed solution based on the credit term variable and the penalty term variable using the application specific objective function.

13. The apparatus of claim 12, wherein the memory stores the following objective function definition $F_{obj}$:

$$F_{obj} = \sum_m \lambda_m^{credit} C_m + \sum_n \lambda_n^{penalty} P_n$$

where, $C_m$ is credit term m, $P_n$ is penalty term n, $\lambda_m^{credit}$ is a weight factor for credit term m, $\lambda_m^{penalty}$ is a weight factor for penalty term n, and m and n are integers greater than or equal to one.

14. The apparatus of claim 12, wherein the constraint problem relates to one of a boiler water reactor core design and a pressurized water reactor core design.

15. The apparatus of claim 12, wherein the constraint problem relates to a large-scale, combinatorial optimization problem in discrete or continuous control variables.

16. The apparatus of claim 12, wherein the at least one of the second number of penalty terms is based on a number of fuel bundle movements.

17. A method of generating a solution to an optimization problem, comprising:

generating at least one candidate solution;

generating an objective function value using a configured objective function, the configured objective function being configured from a generic objective function definition, the generic objective function definition being a sum of a first number of credit components plus a sum of a second number of penalty components, each credit component including a credit term and each penalty component including a penalty term, at least one of the penalty components configured to increase in significance within the configured objective function as an amount of fuel bundle movement in the candidate solution increases; and accessing convergence on a solution based on the objective function values.

18. The method of claim 17, wherein the at least one of the penalty components is based on a number of fuel bundle movements.

19. A method of configuring an objective function, comprising:

generating an objective function definition generic to constraint problems, the generic objective function definition being a sum of a first number of credit terms plus a sum of a second number of penalty terms;

generating at least one credit term based on user input;

generating at least one penalty term configured to increase in significance within the configured objective function as an amount of fuel bundle movement in a proposed solution increases; and generating a figure of merit with the objective function the figure of merit useable to evaluate the proposed solution to a constraint problem.

20. The method of claim 19, wherein the at least one penalty term is generated based on a number of fuel bundle movements.

* * * * *